US010554598B2

(12) United States Patent
Cadiz et al.

(10) Patent No.: US 10,554,598 B2
(45) Date of Patent: Feb. 4, 2020

(54) ACCESSIBILITY PROCESSING WHEN MAKING CONTENT AVAILABLE TO OTHERS

(71) Applicant: Microsoft Technology Licensing, LLC, Redmond, WA (US)

(72) Inventors: Jonathan J. Cadiz, Bellevue, WA (US); Ilya David Gorelik, Seattle, WA (US); Philip Z. Loh, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 222 days.

(21) Appl. No.: 15/373,890

(22) Filed: Dec. 9, 2016

(65) Prior Publication Data

US 2018/0167488 A1 Jun. 14, 2018

(51) Int. Cl.
*G06F 15/16* (2006.01)
*H04L 12/58* (2006.01)

(52) U.S. Cl.
CPC .................................. *H04L 51/066* (2013.01)

(58) Field of Classification Search
CPC ...................................................... H04L 67/327
See application file for complete search history.

(56) References Cited

U.S. PATENT DOCUMENTS

| | | | |
|---|---|---|---|
| 5,283,887 A | 2/1994 | Zachery | |
| 6,108,688 A | 8/2000 | Nielsen | |
| 7,921,225 B2* | 4/2011 | Bonefas | H04L 1/1635 709/218 |
| 7,937,470 B2* | 5/2011 | Curley | H04L 41/12 370/241 |
| 8,539,029 B2* | 9/2013 | Manning | G06Q 10/107 709/206 |
| 8,630,883 B2* | 1/2014 | Law | G06Q 10/02 705/1.1 |
| 9,037,661 B2 | 5/2015 | Gracy et al. | |
| 9,183,548 B2* | 11/2015 | Dutta | G06F 21/10 |
| 9,220,010 B2* | 12/2015 | Bonefas | H04L 63/101 |
| 9,317,485 B2* | 4/2016 | Dent | G06Q 10/107 |
| 9,680,777 B2* | 6/2017 | Griffin | G06Q 10/107 |
| 2004/0025057 A1* | 2/2004 | Cook | G06Q 10/107 726/28 |
| 2005/0160065 A1 | 7/2005 | Seeman | |
| 2006/0114832 A1* | 6/2006 | Hamilton | H04W 76/20 370/244 |
| 2006/0277250 A1 | 12/2006 | Cherry et al. | |
| 2008/0168523 A1* | 7/2008 | Ansari | G06Q 30/04 725/131 |
| 2012/0331081 A1 | 12/2012 | Roic et al. | |

(Continued)

OTHER PUBLICATIONS

"Office: For IT professionals: Planning guide for Microsoft Office 2010", Published on: Dec. 2010 Available at: http://download.microsoft.com/download/4/E/B/4EBEE2A3-6B6A-4B2C-8956-119CE3ED539C/ORKPlanning.doc.

(Continued)

*Primary Examiner* — Moustafa M Meky
*Assistant Examiner* — Thorne E Waugh
(74) *Attorney, Agent, or Firm* — Christopher J. Volkmann; Kelly, Holt & Christenson, PLLC

(57) ABSTRACT

Content is created and is made consumable by a user. A Property associated with the user is accessed to determine whether the user is to receive accessibility content. If so, accessibility content alert processing is performed on the content.

18 Claims, 13 Drawing Sheets

(56) References Cited

U.S. PATENT DOCUMENTS

2013/0124465 A1\* 5/2013 Pingel ................... G06F 3/0604
  707/610
2017/0230470 A1\* 8/2017 Ravishankar ........... G06F 9/451

OTHER PUBLICATIONS

"Accessible Email: Email accessibility Report", Retrieved on: Aug. 12, 2016 Available at: http://accessibleemail.org/sharedresults.php?sessionId=httpcampaignmonitorcmailcomtiewmaily.

"Campaign Monitor: Accessibility and Email Campaigns", Retrieved on: Aug. 12, 2016 Available at: https://www.campaignmonitor.com/resources/guides/accessibility/.

Lierop, Maarten, "Accessible Email", Retrieved on: Aug. 12, 2016 Available at: http://www.accessible-email.org/about.html.

"DocuWare: E-Mail Notification does not work—troubleshooting", Retrieved on: Aug. 12, 2016 Available at: https://www.docuware.com/support_faq/index.php?sid=129213&lang=en&action=artikel&cat=25&id=1329&artlang=en.

\* cited by examiner

FIG. 3A

Pop Out   X   Discard

John Doe; Jane Deer, Joe Smith; ...: These recipients are sending automatic replies.
Jane prefers accessible content. Press here to run the Accessibility Checker

FROM
TO...        John Doe; Jane Deer, Joe Smith; ...;
CC...        Richard H.
BCC...
SUBJECT      RE: ACME application issue

SEND

From: Jane Smith
Sent: Wednesday, September 14, 2016 3:42 AM
To:   John Doe; Jane Deer, Joe Smith; ...;
Subject: RE: ACME application issue Comments inline

...

ACCESSIBILITY PROCESSING WHEN MAKING CONTENT AVAILABLE TO OTHERS

BACKGROUND

Computer systems are currently in wide use. Some such computer systems allow one or more users to generate content (such as messages, documents, meeting requests, or other content) and share that content with other users.

For example, an electronic mail (e-mail) system allows a user to generate content, such as a message, and to send it to one or more other users (or recipients). The e-mail message may have an attachment (such as a document, a slide presentation, a spreadsheet attachment, etc.). A document management system may allow a user to create a document and share it with other users. Collaborative environments allow users to collaborate on content, in groups. These and a wide variety of other computing systems allow a user to generate content and make it available for consumption (viewing, reading, editing, etc.) by other users.

Some users of such systems may benefit if the content is generated as accessibility content. By accessibility content, it is meant that the content conforms to certain rules, procedures or guidelines that can be used to make content accessible for people with disabilities, and may also make the content accessible for user agents, such as mobile phones or smartphones. The rules, procedures or guidelines may be arranged in terms of requirements that the content must meet. The requirements may have different priority levels, such that a given item of content may be accessibility content, but may only conform to certain requirements of a certain priority level. One example of such a set of guidelines is referred to as the web content accessibility guidelines. Of course, other guidelines can be used as well.

Computer systems that can be used to generate content may serve an organization which has multiple different users. It may also serve multiple different organizations (such as in a multi-tenant environment), or it may serve a plurality of individual users. Therefore, when a user generates content that is to be shared with (e.g., sent to or shared with), other users, the creating user may not know whether the other users would benefit from receiving the content as accessibility content. Therefore, one or more recipients of the content may find it inaccessible, or very difficult to access.

Some computing systems include accessibility checking systems. An accessibility checking system can run checks on content to determine whether it qualifies as accessibility content, or whether it has accessibility issues that need to be addressed before it can be qualified as accessibility content. However, where a creating user does not even know that recipient may benefit from accessibility content, the creating user may not even run an accessibility checker on the created content.

The discussion above is merely provided for general background information and is not intended to be used as an aid in determining the scope of the claimed subject matter.

SUMMARY

Content is created and is made consumable by a user. A property associated with the user is accessed to determine whether the user is to receive accessibility content. If so, accessibility content alert processing is performed on the content.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 3A-3D are examples of user interface displays.

DETAILED DESCRIPTION

Figure 1:
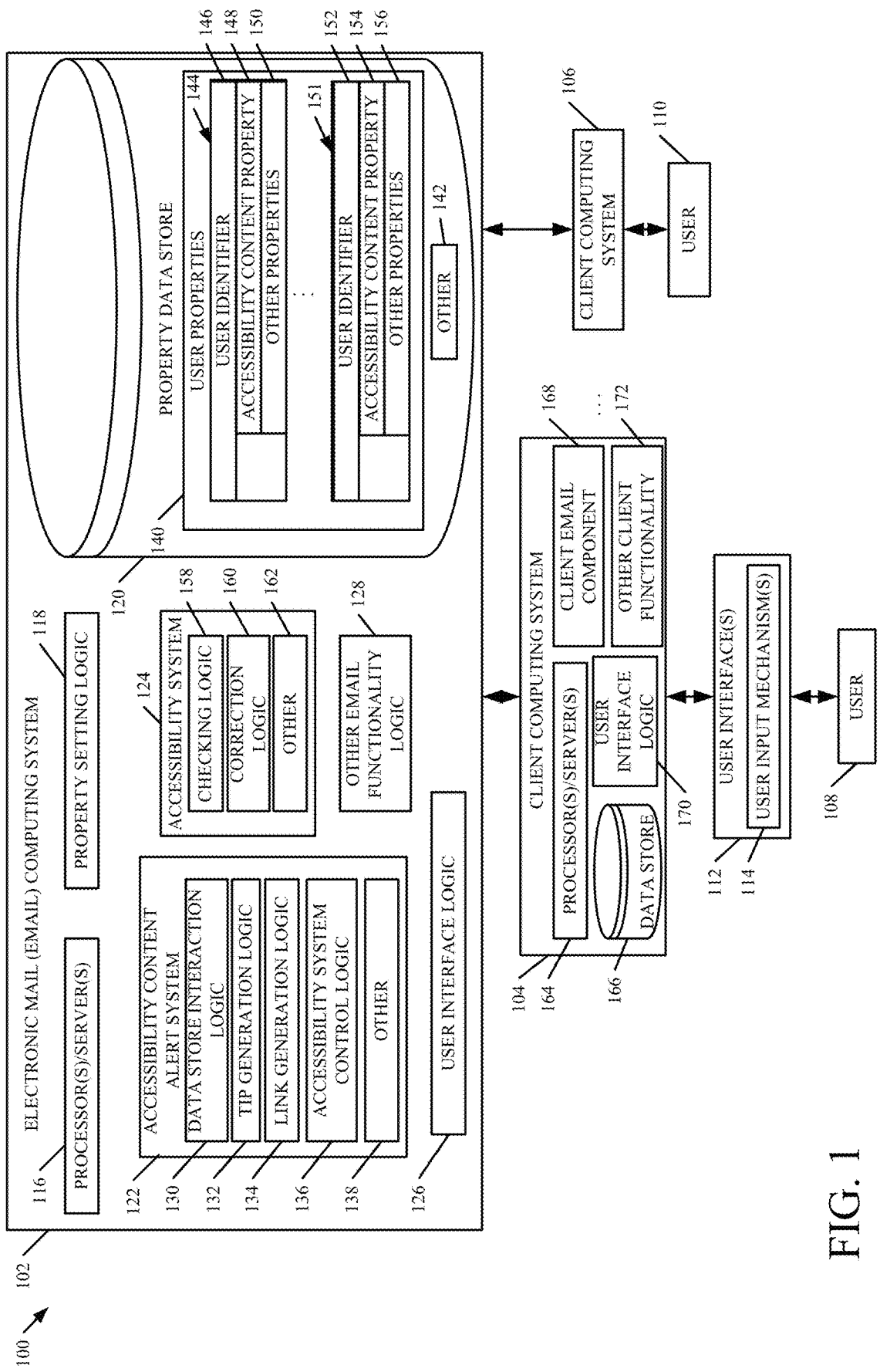
FIG. 1 is a block diagram of one example of a computing system architecture.

FIG. 1 is a block diagram of one example of a computing system architecture 100. Architecture 100 shows an electronic mail (e-mail) computing system 102 that interacts with a plurality of different client computing systems 104-106. Users 108-110 illustratively interact with corresponding client systems 104-106. Client computing system 106 can be similar to client computing system 104, or different. For purposes of the present description, it will be assumed that it is similar to client computing system 104, so that only client computing system 104 is described in more detail. In the example illustrated in FIG. 1, client computing system 104 generates user interfaces 112 with user input mechanisms 114 for interaction by user 108. User 108 can interact with user input mechanisms 114 in order to control and manipulate client computing system 104 and e-mail computing system 102. It will be appreciated that client computing system 106 can also generate user interfaces for interaction by user 110, but they are only shown for client computing system 104, for the sake of example.

The user interfaces 112 and user input mechanisms 114 can take a wide variety of different forms. They can be visual displays with user actuatable input mechanisms, such as links, icons, text boxes, etc. They can also be audio interfaces that generate an audio output and receive audio inputs or commands from user 108. They can include haptic interfaces, touch-based interfaces, or other interfaces as well.

It will also be noted that the discussion of accessibility processing that follows is with respect to e-mail computing system 102, but it can just as easily apply to other computing systems, such as a document management system, an instant messaging system, a collaboration computing system, or other computing systems. It is described with respect to an e-mail computing system for the sake of example only.

E-mail computing system 102 illustratively includes one or more processors or servers 116, property setting logic 118, property data store 120, accessibility content alert system 122, accessibility system 124, user interface logic 126, and it can include a wide variety of other e-mail functionality 128. Accessibility content alert system 122, itself, illustratively includes data store interaction logic 130, tip generation logic 132, link generation logic 134, accessibility system control logic 136, and it can include other items 138. Property data store 120 can include user properties 140 and a wide variety of other information 142. User properties 140 can include a set of properties corresponding to each individual user of e-mail computing system 102. For instance, properties 140 can include a first set of properties 144 that has a user identifier 146 identifying the user, an accessibility content property 148 for that user and other properties 150 for that user as well. Properties 140 can also include a second set of properties 151 (for another user), that includes user identifier 152 that identifies the other user, an accessibility content property 154 for that user, as well as other properties 156 for that user.

Accessibility system 124 can include checking logic 158, and correction logic 160. It can include other items 162.

Client computing system 104 can include one or more processors or servers 164, data store 166, client mail component 168, user interface logic 170 and it can include other client functionality 172. It will be noted that data store 166 can store user properties for user 108 instead of, or in addition to, property data store 120. For instance, data store 166 may include a personal contact list or address book of user 108. That may include an entry for user 110, as well. These scenarios are described in greater detail below.

Before describing the overall operation of architecture 100 in more detail, a brief description of some of the items in architecture 100, and their operation, will first be provided. Property setting logic 118 can reside on e-mail computing system 102 or client computing system 104 or it can be separate from both systems 102 and 104. It is shown on e-mail computing system 102 for the sake of example only. Logic 118 illustratively generates user interfaces that can be interacted with by user 108, in order to set user properties 140 for user 108. It can also generate user interfaces that can be interacted with by an administrative user, or other user 110, to set user properties as well.

User 108 can use client computing system 104 to access e-mail computing system 102 in order to generate content. The content described herein will be an e-mail message, but it could also be an attachment to an e-mail message. Further, where computing system 102 is a document management system, then the content may be a document. Where it is a collaborative computing system, then the content may be a document that can be collaborated on by multiple different users. Where it is a scheduling system, then the content may be a meeting request. Where computing system 102 is another type of messaging system, then the content may be a different type of message, other than an e-mail message. All these and other systems are contemplated herein.

For purposes of the present description, it will be assumed that user 108 interacts with user interfaces 112 in order to author an e-mail message that is to be sent by user 108, using e-mail computing system 102, to user 110. In that case, data store interaction logic 130 illustratively accesses user properties 140 for user 110 to determine whether the user 110 has an accessibility content property 148 that is set to a value indicating that user 110 wishes to receive content in the form of accessibility content. If so, accessibility content alert system 122 can perform accessibility content alert processing on the content (e.g., on the e-mail message generated by user 108). For example, tip generation logic 132 can generate a tip on a user interface 112 for user 108 indicating that the recipient of the e-mail message (i.e., user 110) wishes to receive content in the form of accessibility content. Link generation logic 134 can surface a link to accessibility system 124, for user 108, so that user 108 can perform accessibility checking using checking logic 158 and can correct any identified accessibility issues using correction logic 160. Accessibility system control logic 136 can generate control signals to automatically control accessibility system 124 to perform accessibility checking on the e-mail message and to correct any accessibility issues that are identified, or to surface those for user correction.

It will also be noted that, in one example, the accessibility property 148 for user 110 (and other accessibility properties for other users) may be stored in a data store that can be accessed by multiple different computing systems. Similarly, accessibility content alert system 122 and accessibility system 124 can also be accessed by other computing systems. Therefore, when a user creates content on any of those computing systems, that is consumable by another user, accessibility content alert system 122 can perform its processing with respect to the content generated on the other computing systems as well. This allows the accessibility content property to be shared (or to roam) across multiple different computing systems, even though it is only set once, in one location.

Figure 2:
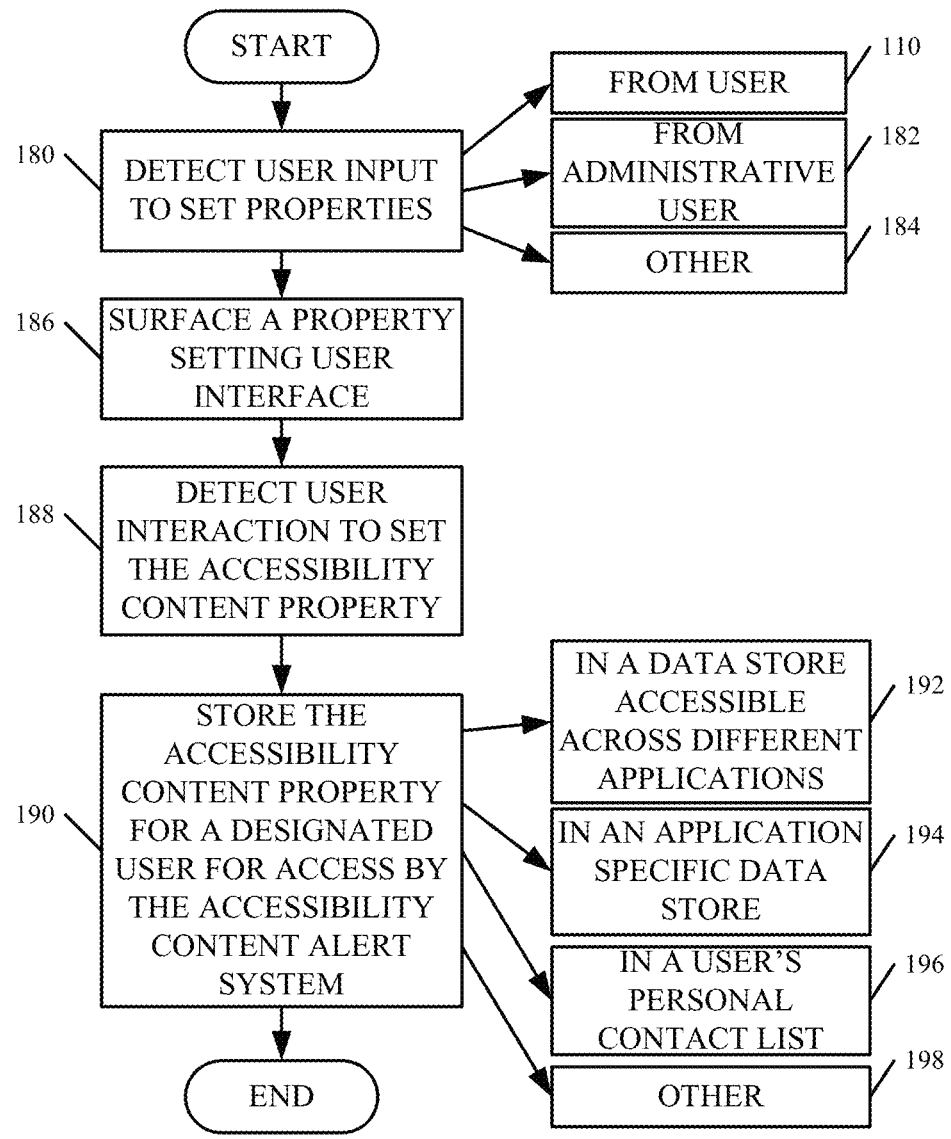
FIG. 2 is a flow diagram illustrating one example of the operation of priority setting logic.

FIG. 2 is a flow diagram showing one example of the operation of property setting logic 118 in enabling a user (such as user 110, or an administrative user) to set an accessibility content property 148 for user 110.

Property setting logic 118 first detects that a user is to receive accessible content. This can be done by detecting a user input indicating that a user wishes to set properties. This is indicated by block 180 in the flow diagram of FIG. 2. The user input can be from the particular user 110 for which the property is to be set. The user input can be from an administrative user 182, or it can be received in other ways 184. This can also be done by automatically detecting that a user is using assistive technology but has not set the property requesting to receive accessibility content.

Property setting logic 118 then surfaces a property setting user interface with a user input mechanism that can be interacted with (or actuated) by user 110 (or another user) to set the user properties. Surfacing a property setting user interface is indicated by block 186 in the flow diagram of FIG. 2. Where property setting is initiated by automatically detecting that a user is using assistive technology (such as a screen reader, etc.), then logic 118 may surface a notification to the user letting the user know that the property can be set, along with the user input mechanism. The fact that the user was notified may be stored so the same notification is not generated on every device the user uses. Property setting logic 118 (through user interface logic 126 or user interface logic 170, or by itself) then detects user interaction with (or actuation of) the user input mechanism on the property setting user interface, to set the accessibility content property for the user. This is indicated by block 188 in the flow diagram of FIG. 2. When this property is set, to a given value, this indicates that the user identified by the corresponding user identifier 146 is to receive content in the form of accessibility content.

Property setting logic 118 then interacts with property data store 120 to store the accessibility content property for the designated user, so that it can be accessed by the accessibility content alert system 122. Storing the accessibility content property in this way is indicated by block 190. As briefly mentioned above, this can be done by storing the accessibility content property for the designated user in a data store that can be accessed across different applications. This is indicated by block 192. It can be stored in an application-specific data store (such as where data store 120 is specific to e-mail computing system 102). This is indicated by block 194. It can be stored in a user's personal contact list, as indicated by block 196. For instance, it may be that user 108, who is authoring the content, knows that user 110 wishes to receive the content in the form of accessibility content. In that case, user 108 can set the accessibility content property 148 for user 110, in the personal contact list or address book of user 108. The accessibility content property can be stored for a designated user, so that it can be accessed by the accessibility content alert system 122 in other ways as well. This is indicated by block 198 in the flow diagram of FIG. 2.

Figure 2A:
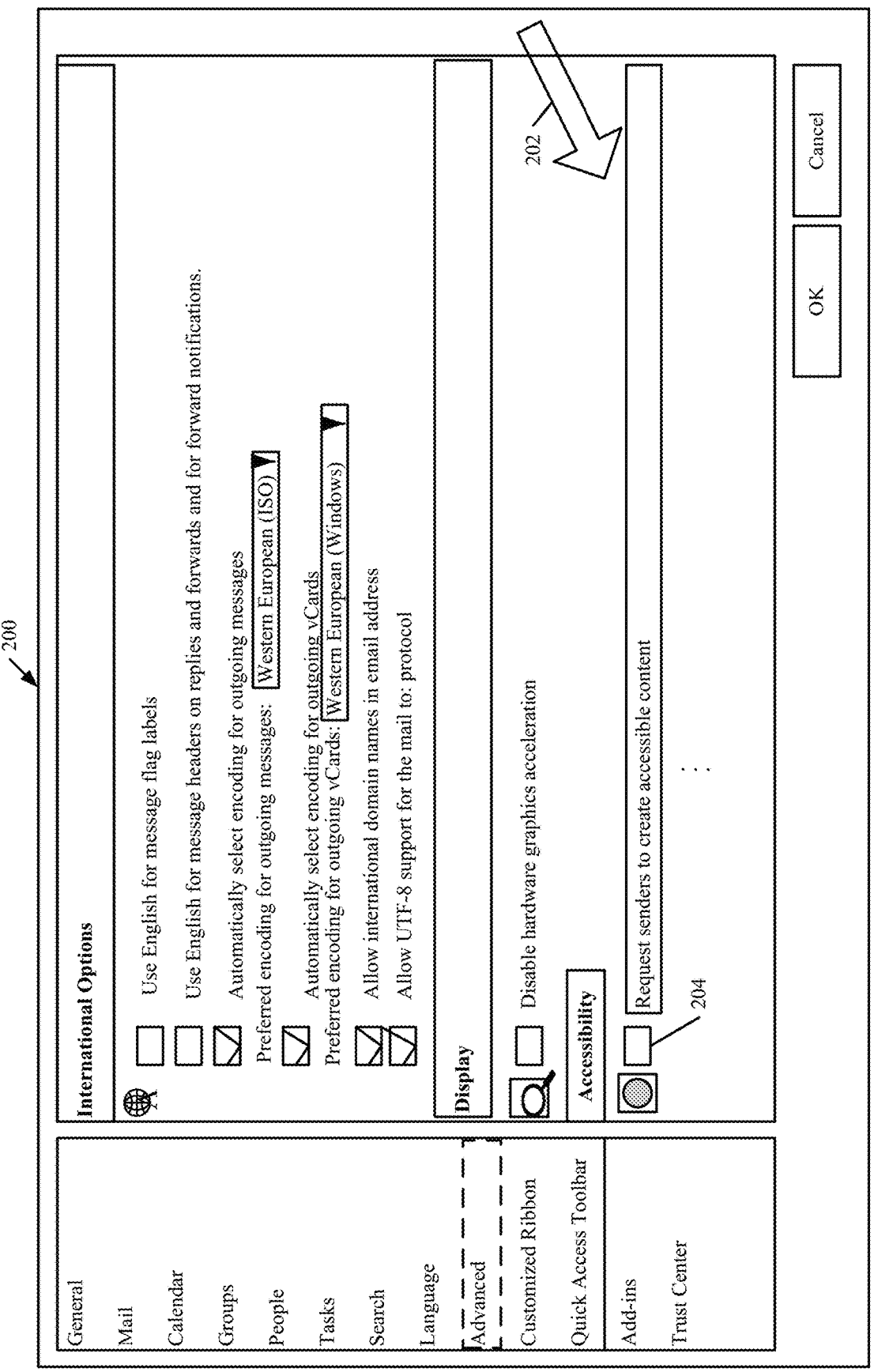
FIG. 2A is one example of a user interface display.

FIG. 2A shows one example of a user interface display 200 that can be generated and surfaced by property setting logic 118. It can be seen that user interface display 200 displays a set of options that can be configured by a user. One part of the set of options is identified by arrow 202 as the accessibility options. In the example shown in FIG. 2A, the accessibility content property can be set by simply checking check box 204. When that is done, property setting logic 118 will store a value for the accessibility content property for that user in data store 120, indicating the user is to receive accessibility content.

Figure 3:
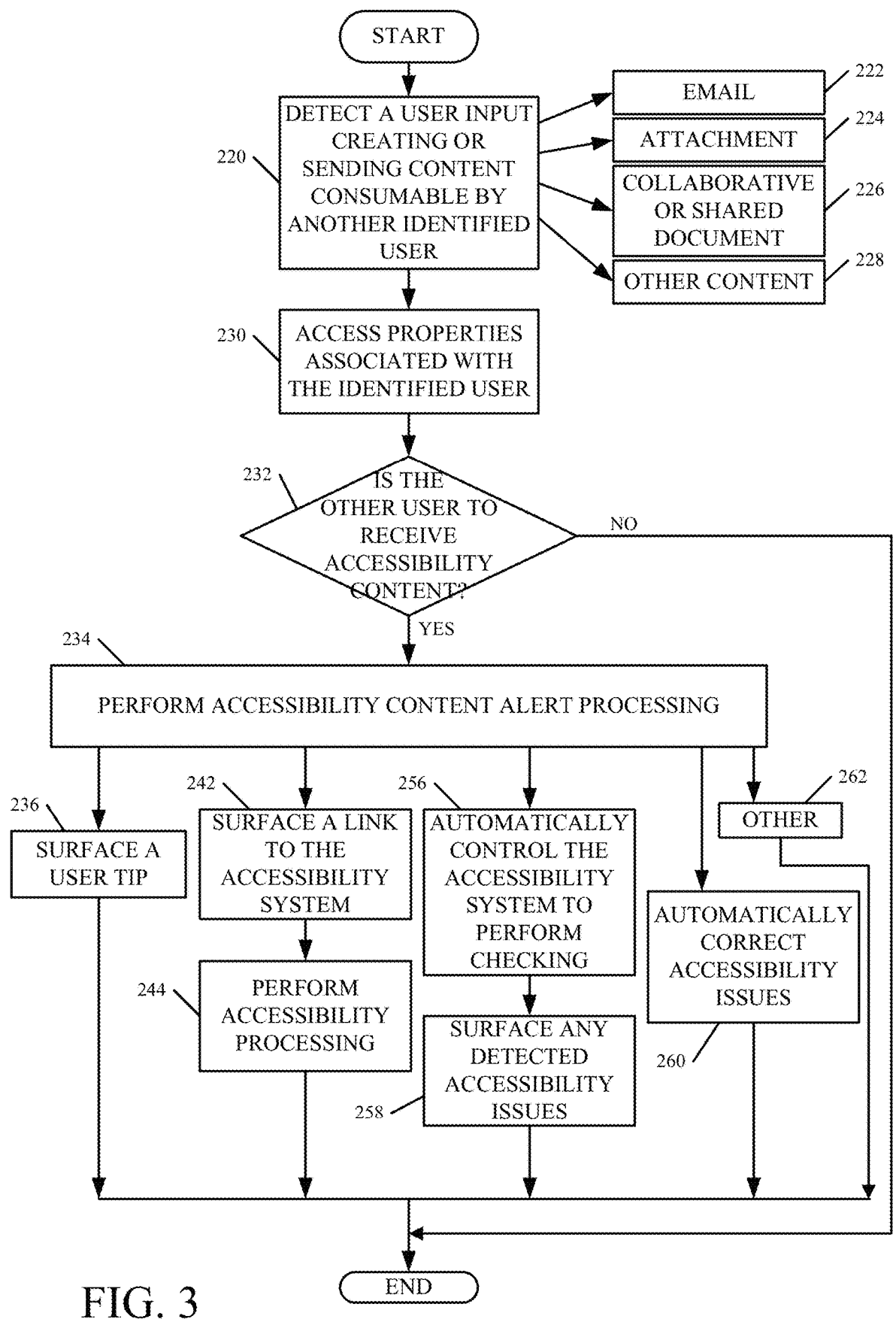
FIG. 3 is a flow diagram illustrating one example of the operation of the computing system architecture shown in FIG. 1, in performing accessibility content alert processing on content created for consumption by a given user.

FIG. 3 is a flow diagram illustrating one example of the operation of accessibility content alert system 122 in processing content (in the example shown in FIG. 1, an e-mail message) when the accessibility content property for a recipient of the content is set to a value that indicates that the recipient is to receive the content in the form of accessibility content. FIGS. 1 and 3 will now be described in conjunction with one another.

Accessibility content 122 first detects a user input in which the user is creating or sending content that will be consumable by another identified user. This is indicated by block 220 in the flow diagram of FIG. 3. Where the content is an e-mail message 222, then the identified user may be one or more of the recipients of the e-mail message. Where the content is an attachment 224 to an e-mail message, then, again, the identified user may be one or more of the recipients of the e-mail message to which the attachment 224 is attached. Where the content is a collaborative or shared document 226, then the identified user may be a user with which the collaborative or shared document is shared, or who has rights to collaborate on the document (such as by viewing it, reading it, editing it, or otherwise consuming it). It will be appreciated that the content can be other content as well, and this is indicated by block 228.

Data store interaction logic 130 then accesses properties 140 associated with the identified user. This is indicated by block 230 in the flow diagram of FIG. 3. It then identifies the particular properties (e.g., the set of properties 144) corresponding to the identified user, based upon the user identifier 146. It determines whether the properties 144 for that user have the accessibility content property 148 set to a value indicating that the user is to receive content in the form of accessibility content. Making this determination is indicated by block 232 in the flow diagram of FIG. 3.

If, at block 232, data store interaction logic 130 determines that the accessibility content property 148 for the identified user is indeed set, then system 122 performs accessibility content alert processing on the content that is being created or is about to be sent or shared. Performing accessibility content alert processing is indicated by block 234 in the flow diagram of FIG. 3. This processing can take a wide variety of different forms.

In one example, tip generation logic 132 generates a user interface tip that can be surfaced for the user creating or sending the content. This is indicated by block 236. The tip may be a textual representation reminding the user that one of the recipients wishes to receive the content as accessibility content, and it may suggest that the user access accessibility system 124 and run the accessibility checking logic 158 to identify any issues with the content that may inhibit it from being presented as accessibility content.

FIG. 3A shows one example of this. FIG. 3A shows one example of a user interface display 236 in which a user is authoring an electronic mail message. The recipients are entered in the recipient user input mechanism 238. In response, data store interaction logic 130 accesses the user properties for each of the recipients to determine whether any of them are to receive the e-mail message in the form of accessibility content. In the example shown in FIG. 3A, this was identified in the affirmative. Therefore, tip generation logic 132 generates a user interface tip 240 in the form of a text string indicating that "Jane prefers accessible content."

Referring again to the flow diagram of FIG. 3, it may be that link generation logic 134 also generates and surfaces a link to the accessibility system 124, along with the tip generated by tip generation logic 132. This is indicated by block 242 in the flow diagram of FIG. 3. When the user actuates that link, the user can be navigated to (or otherwise exposed to) a user interface for accessibility system 124, that allows the user to use accessibility system 124 to check for accessibility issues with the content, and to correct those issues. Performing this type of accessibility processing is indicated by block 244 in the flow diagram of FIG. 3.

Referring again to FIG. 3A, the user interface display 236 also shows that link generation logic 134 has generated and surfaced a link 246 for the user. Therefore, when the user actuates link 246, the user may be navigated to a user interface that allows the user to control accessibility system 124.

Figure 3B:
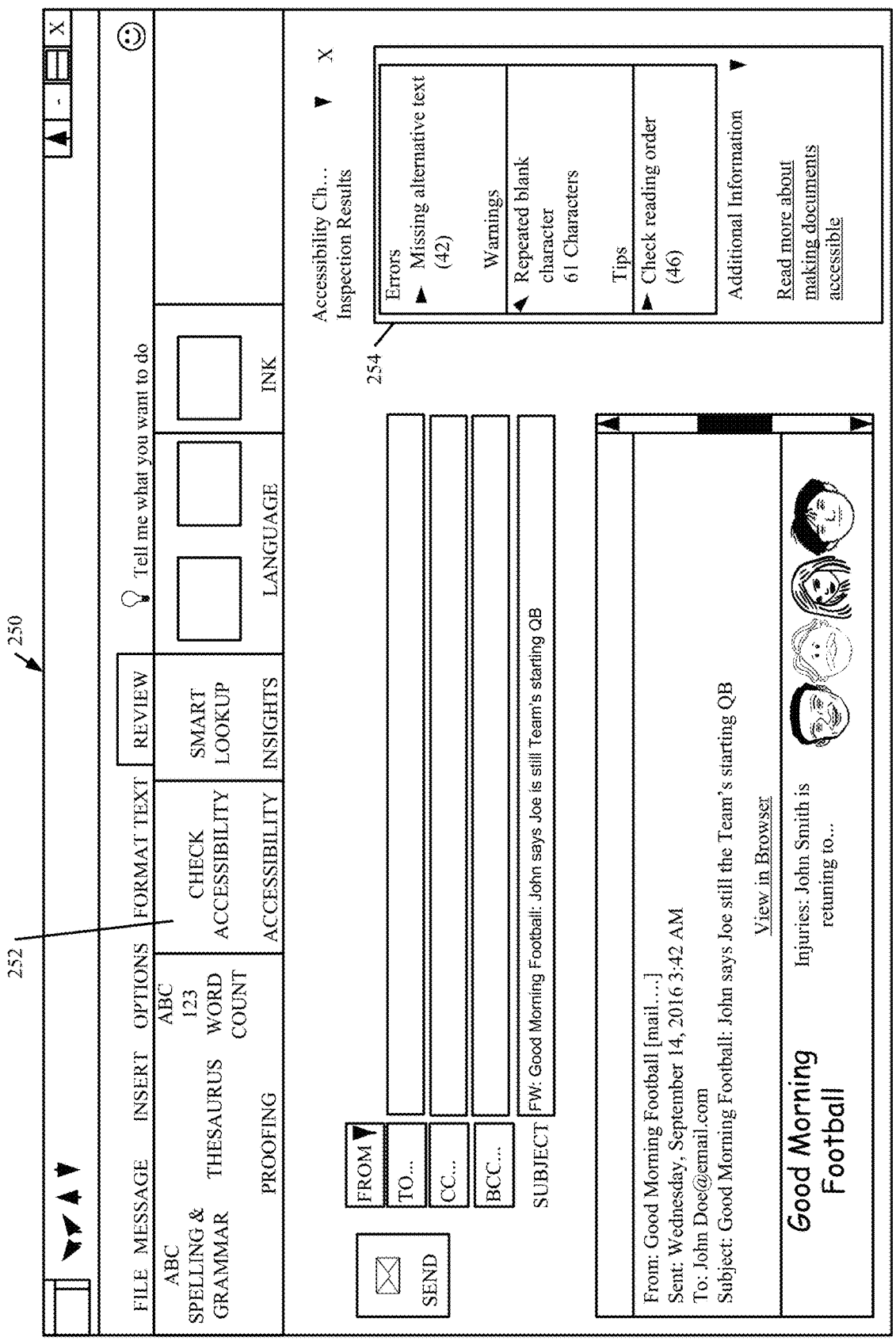

FIG. 3B shows another example of a user interface display 250. User interface display 250 also shows that the user is generating an e-mail message. User interface display 250 includes an accessibility system interface mechanism 252 that allows the user to interact with accessibility system 124, and specifically checking logic 158, in order to check the content of the e-mail message to see whether there are any accessibility issues with it. When the user actuates this, then checking logic 158 illustratively performs accessibility checking on the content of the e-mail message (and it can also perform this on any attachments to the e-mail message) to determine whether there are any accessibility issues. It can then generate a user interface display pane or other user interface mechanism 254 which displays the results of the accessibility checking run by checking logic 158.

Returning to the flow diagram of FIG. 3, in another example, it may be that accessibility system control logic 136 controls accessibility system 124 to automatically perform accessibility checking on the content of the e-mail message, once it is determined that one of its recipients is to receive accessibility content. This may be done in the background so that the author of the e-mail message (or other content) need not even be aware of the accessibility checking being performed. It will noted, however, that a user interface mechanism may be surfaced for the user who is authoring the e-mail message, indicating that the accessibility checking is being performed as well. Automatically controlling the accessibility system 124 to perform accessibility checking on the content is indicated by block 256 in the flow diagram of FIG. 3. Checking logic 158 can also surface any detected accessibility issues. This is indicated by block 258 in the flow diagram of FIG. 3.

In yet another example, accessibility system control logic 136 can control accessibility system 124 to not only perform automatic accessibility checking using checking logic 158, but it can also generate control signals to control correction logic 160 to automatically correct those accessibility issues, at least in some cases. This is indicated by block 260. For instance, certain accessibility issues may be easily corrected, and such issues can be automatically corrected. Other accessibility issues may have multiple different options for correction, and those issues may be surfaced for user correction. In another example, control logic 136 can generate control signals to control correction logic 160 to automatically correct all accessibility issues that can be automatically corrected. All of these scenarios, and others, are contemplated herein.

Accessibility content alert system 122 can perform other alert processing as well, and this is indicated by block 262.

Figure 3C:
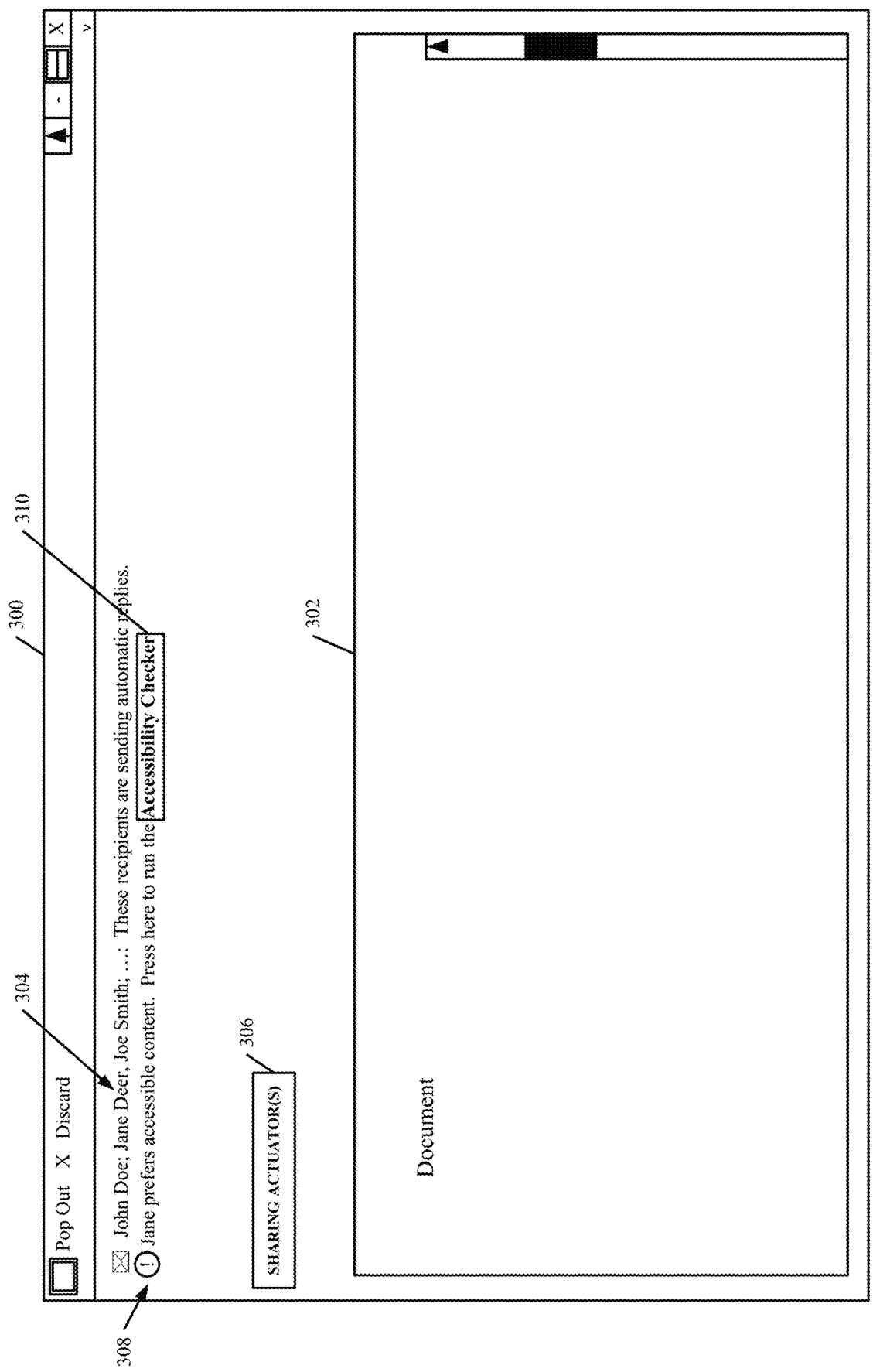
Figure 3D:
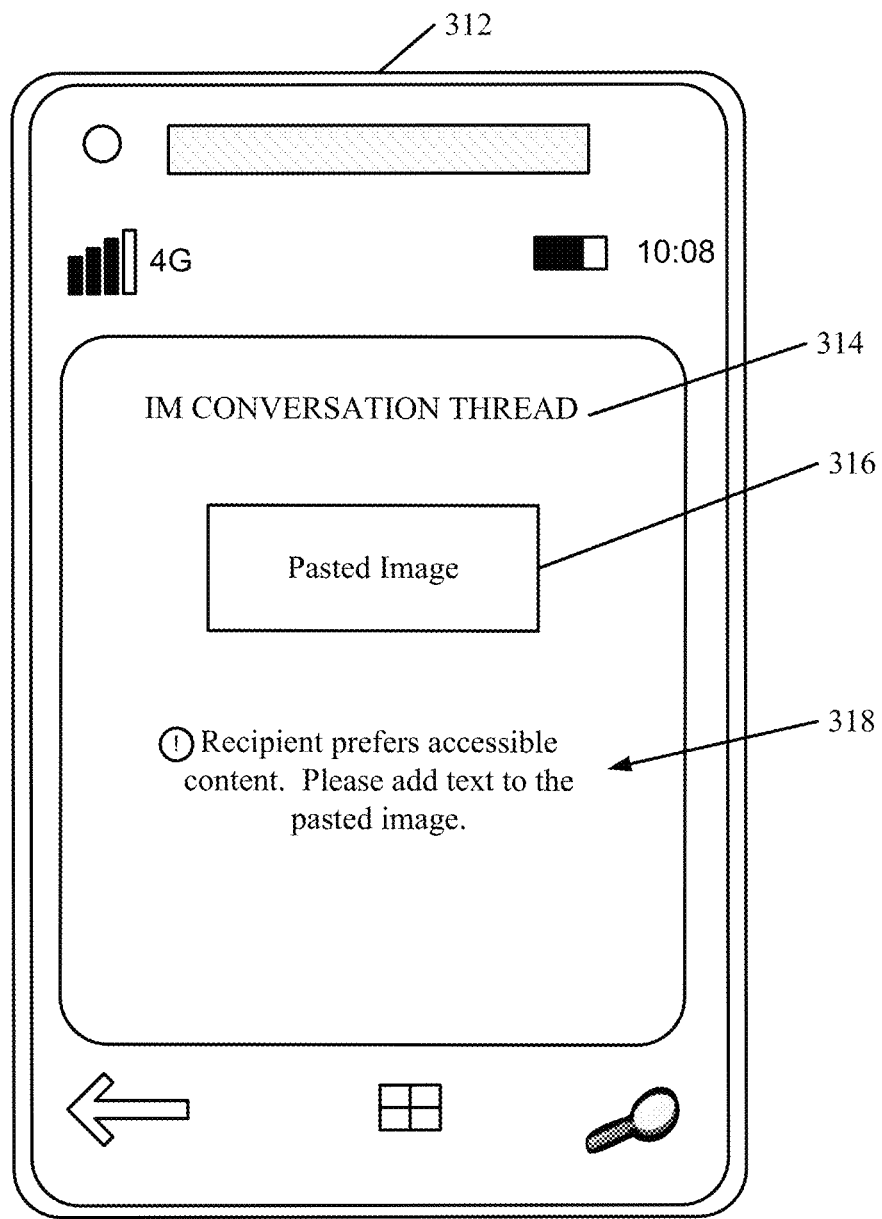

FIGS. 3C and 3D show two additional experiences. FIG. 3C shows a user interface display 300 that a user is using to share a document 302 on a document management site, with a plurality of different people identified at 304. The user can do this by interacting with sharing actuators 306. When this happens, the system detects that one of the people that document 302 is being shared with prefers accessibility content and generates an alert 308 for the user. The user can then actuate actuator 310 to run the accessibility checker.

FIG. 3D shows a user interface display 312 in which a user is engaged in an instant messaging conversation with another user, illustrated generally by IM thread 314. The user has pasted an image 316 into the message thread, and an alert 318 is generated for the user. Another actuator can also be displayed which allows the user to run the accessibility checker from user interface display 312 as well.

It can thus be seen that the present discussion improves the computing system itself. The computing system will now generate accessible content, much more often, and the accessible content can be generated automatically. Thus, the process of transforming content into accessibility content can be done automatically, or issue checking can be done automatically and the issues can be surfaced for the user. Alternatively, the accessibility tip can be generated for the user and the user can manually perform the accessibility checking and correction, using accessibility system 124. In all of these cases, the processing of the computer system is improved, in that it is much more likely to generate accessible content, where a user who will be consuming that content is to receive accessibility content.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 4:
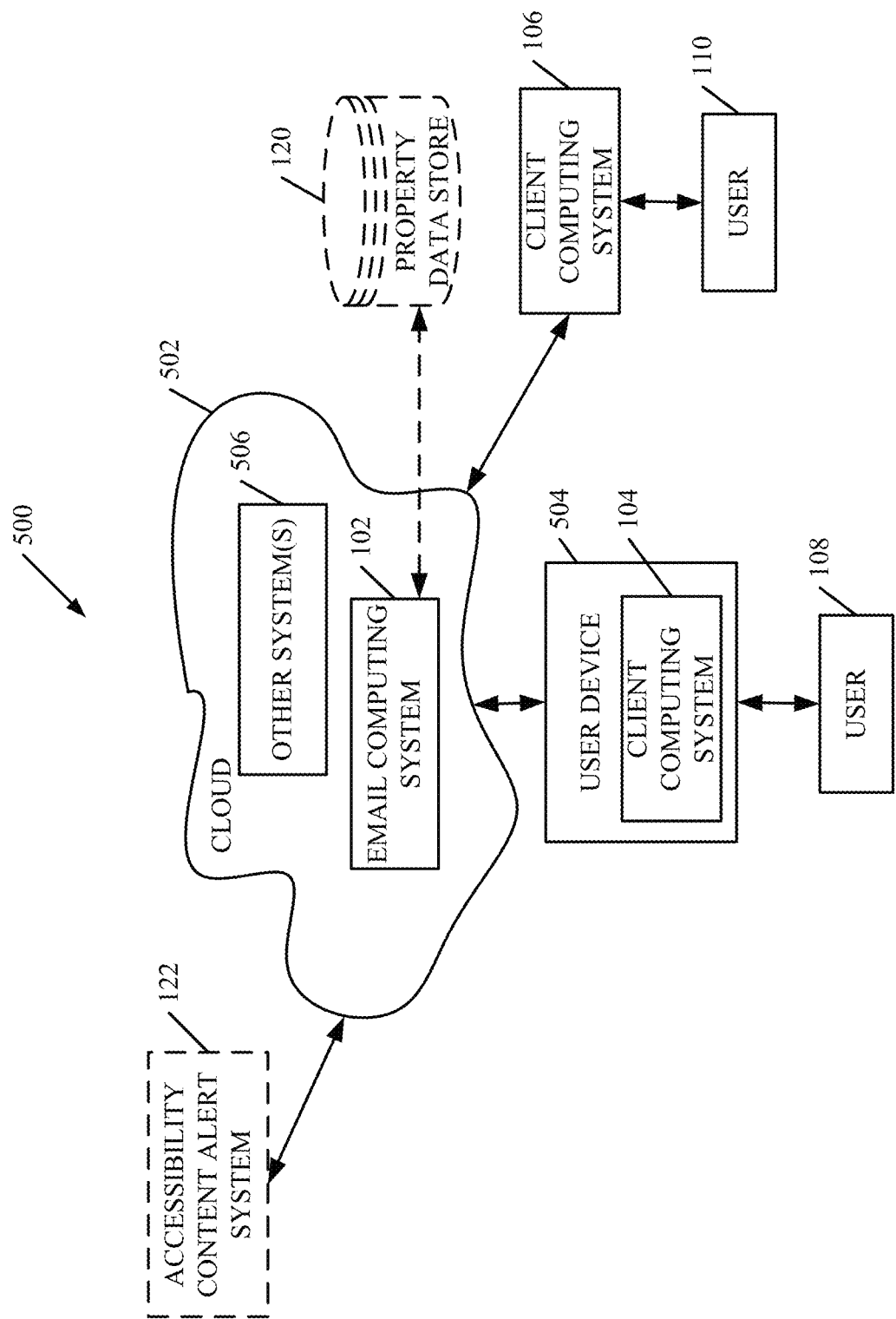
FIG. 4 is a block diagram showing the computing system architecture illustrated in FIG. 1, deployed in a cloud computing architecture.

FIG. 4 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 4, some items are similar to those shown in FIG. 1 and they are similarly numbered. FIG. 4 specifically shows that email computing system 102 and/or any of a wide variety of other computing systems 506 can be located in cloud 502 (which can be public, private, or a combination where portions are public while others are private). Therefore, user 108 uses a user device 504 to access those systems through cloud 502.

FIG. 4 also depicts another example of a cloud architecture. FIG. 4 shows that it is also contemplated that some elements of architecture 100 can be are disposed in cloud 502 while others are not. By way of example, property data store 120 can be disposed outside of cloud 502, and accessed through cloud 502. In another example, accessibility content alert system 122 can be outside of cloud 502 (or inside cloud 502 but separate from system 102) and accessed by systems 102 and 506. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
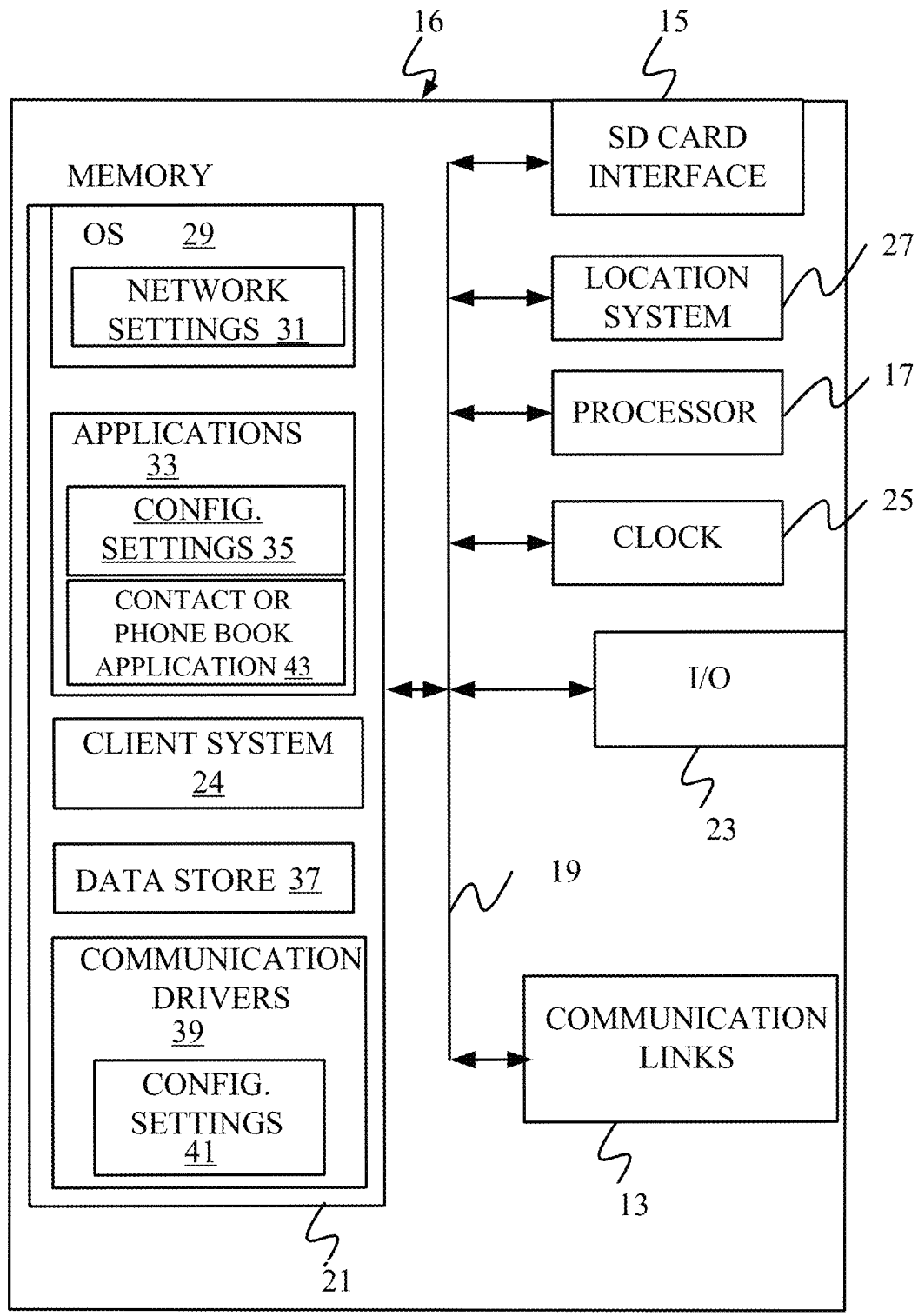
FIGS. 5-7 show examples of mobile devices that can be used in the architectures shown in the previous figures.
Figure 6:
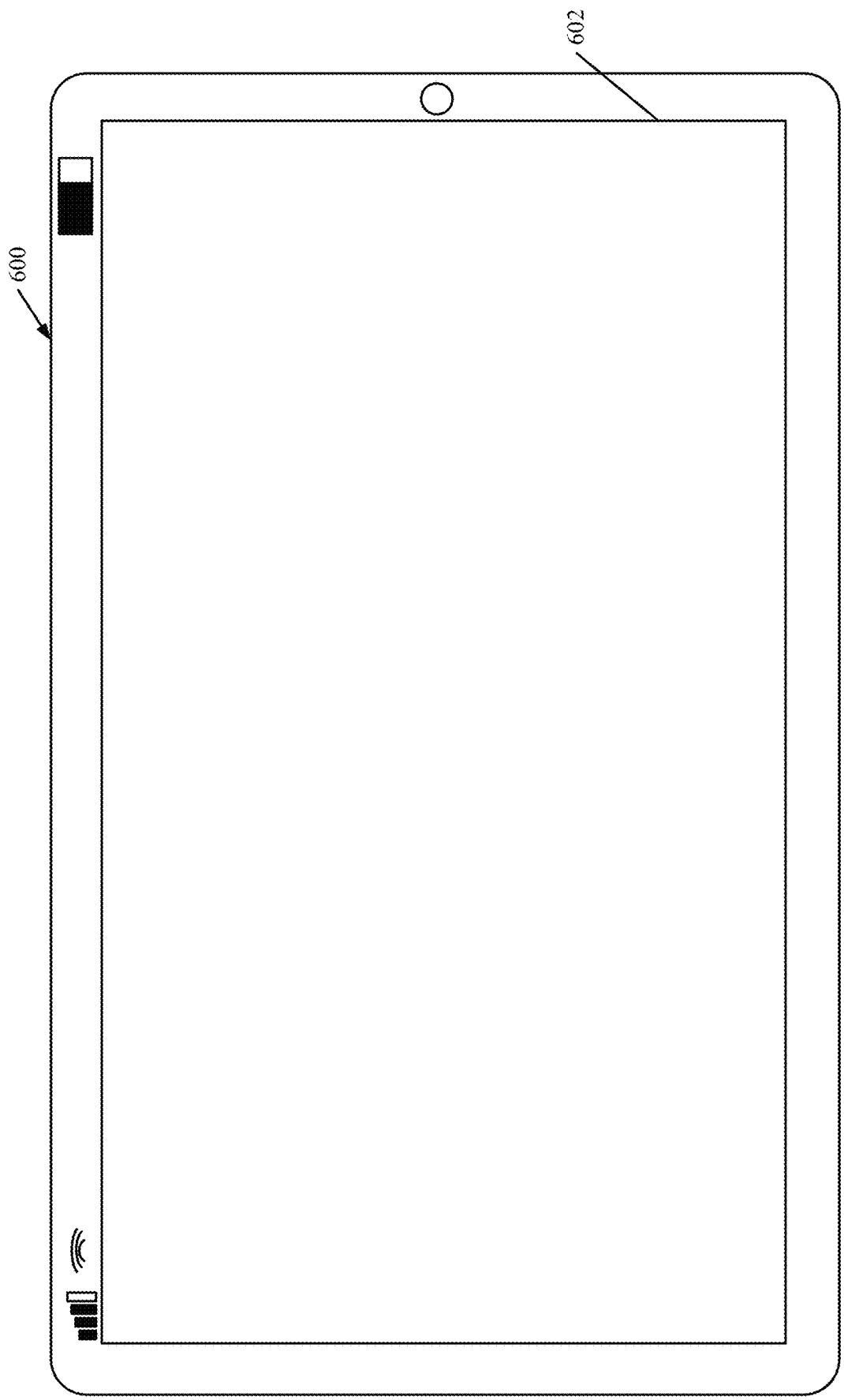
Figure 7:
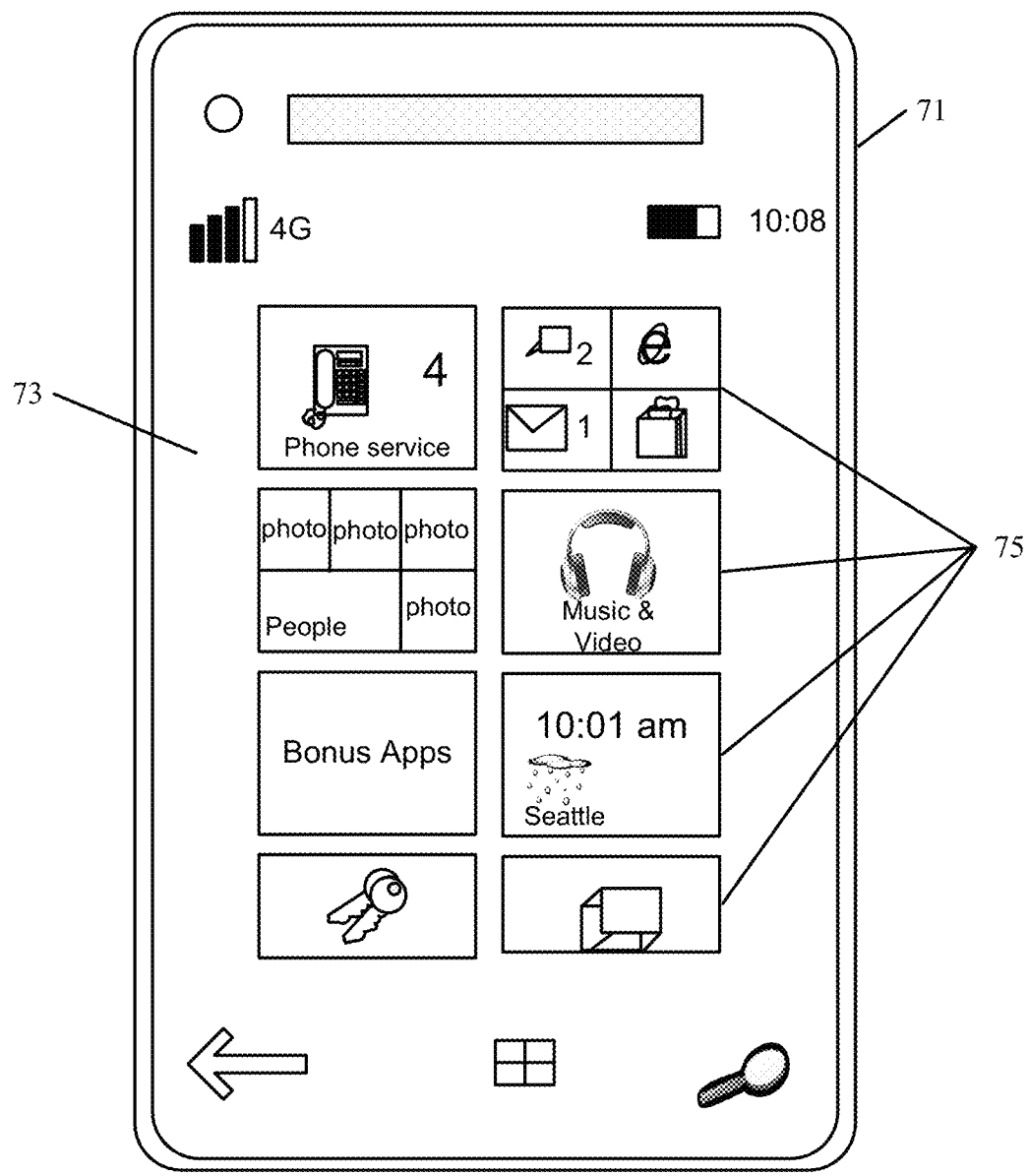

FIG. 5 is a simplified block diagram of one illustrative example of a handheld or mobile computing device that can be used as a user's or client's hand held device 16, in which the present system (or parts of it) can be deployed. FIGS. 6-7 are examples of handheld or mobile devices.

FIG. 5 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers 116 or 164 or those in other devices) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of the computing system. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 6 shows one embodiment in which device 16 is a tablet computer 600. In FIG. 6, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 7 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 8:
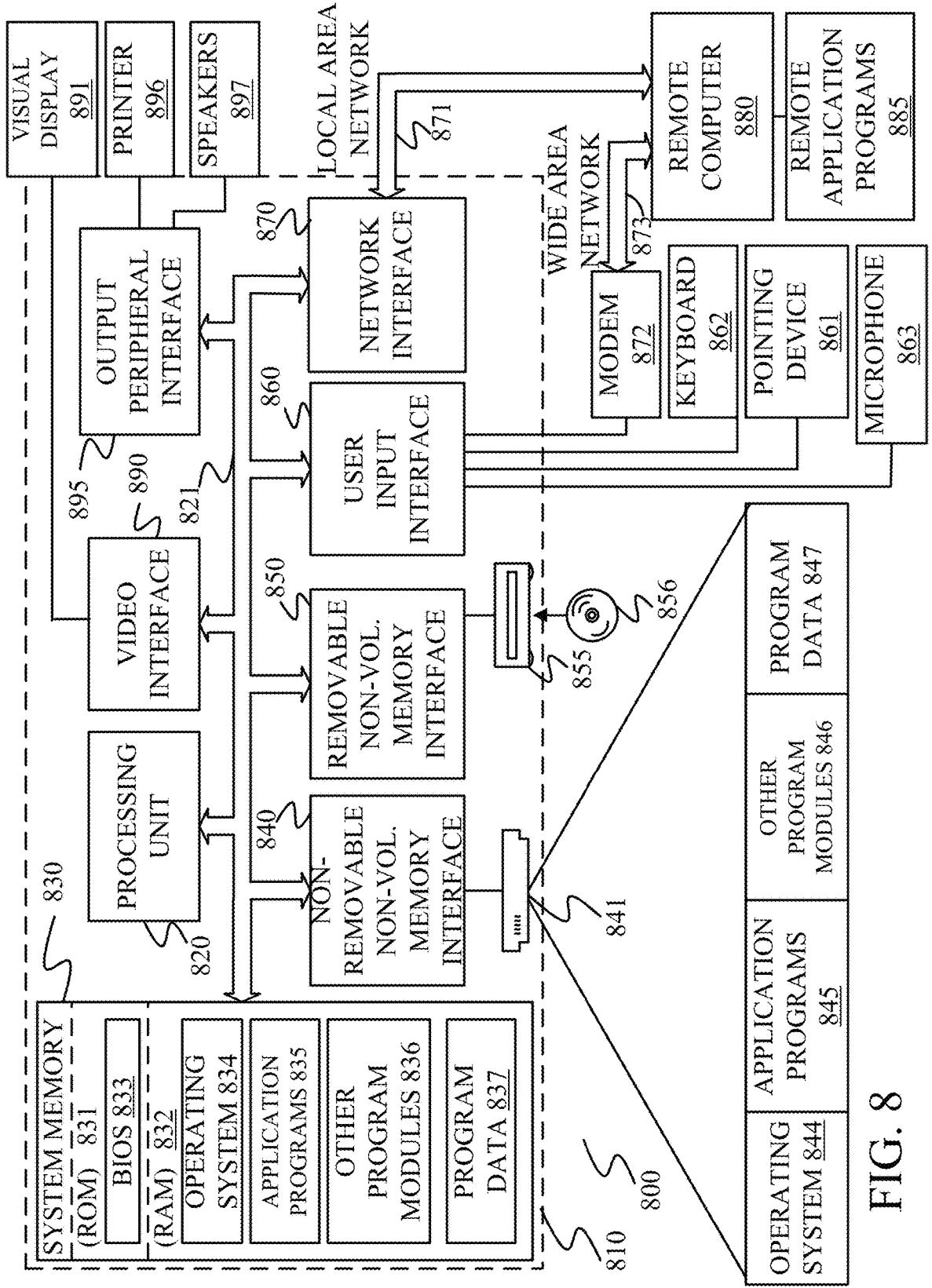
FIG. 8 is a block diagram of one example of a computing environment that can be used in the architectures shown in the previous figures.

FIG. 8 is one example of a computing environment in which architecture 100, or parts of it, (for example) can be deployed. With reference to FIG. 8, an example system for implementing some embodiments includes a general-purpose computing device in the form of a computer 810. Components of computer 810 may include, but are not limited to, a processing unit 820 (which can comprise processor 116, 164 or those in other devices or in other systems), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

an accessibility content alert system that detects content that is to be made, by a first user, consumable by a second user;

data store interaction logic that accesses an accessibility content property having a value and corresponding to the second user, the value of the accessibility content property indicating whether the second user is to receive the content as accessibility content; and tip generation logic that generates a tip user interface element for the first user indicating that the second user is to receive the content as accessibility content, based on the value of the accessibility content property corresponding to the second user.

Example 2 is the computing system of any or all previous examples wherein the accessibility content alert system comprises:

link generation logic configured to generate a link user interface element actuatable by the first user to surface for the first user a user input mechanism that is actuatable to control an accessibility system to operate on the detected content.

Example 3 is the computing system of any or all previous examples wherein the accessibility content alert system comprises:

accessibility system control logic that, based on the value of the accessibility content property corresponding to the second user, generates control signals to control checking logic in an accessibility system to detect accessibility issues in the content and surface the detected accessibility issues for the first user.

Example 4 is the computing system of any or all previous examples wherein the accessibility content alert system comprises:

accessibility system control logic that, based on the value of the accessibility content property corresponding to the second user, generates control signals to control correction logic in an accessibility system to correct detected accessibility issues in the content.

Example 5 is the computing system of any or all previous examples wherein the computing system includes the accessibility system.

Example 6 is the computing system of any or all previous examples and further comprising:

property setting logic configured to surface a property setting user input mechanism actuatable to set the value of the accessibility content property in a data store.

Example 7 is the computing system of any or all previous examples wherein the property setting logic is configured to surface the property setting user input mechanism for setting the value of the accessibility content property in a data store that is configured to be accessed by a plurality of different computing systems that generate content.

Example 8 is the computing system of any or all previous examples wherein the property setting logic is configured to surface the property setting user input mechanism for setting the value of the accessibility content property in an application-specific data store that is configured to be accessed by a single computing system that generates content.

Example 9 is the computing system of any or all previous examples wherein the property setting logic is configured to surface the property setting user input mechanism for setting the value of the accessibility content property in a personal contact list of the first user.

Example 10 is a computer implemented method, comprising:

detecting content that is to be made, by a first user, consumable by a second user;

accessing an accessibility content property having a value and corresponding to the second user, the value of the accessibility content property indicating whether the second user is to receive the content as accessibility content; and generating a tip user interface element for the first user indicating that the second user is to receive the content as accessibility content, based on the value of the accessibility content property corresponding to the second user.

Example 11 is the computer implemented method of any or all previous examples and further comprising:

generating a link user interface element actuatable by the first user to surface for the first user a user input mechanism that is actuatable to control an accessibility system to operate on the detected content.

Example 12 is the computer implemented method of any or all previous examples and further comprising:

controlling, based on the value of the accessibility content property corresponding to the second user, checking logic in an accessibility system to detect accessibility issues in the content and surface the detected accessibility issues for the first user.

Example 13 is the computer implemented method of any or all previous examples and further comprising:

controlling, based on the value of the accessibility content property corresponding to the second user, correction logic in an accessibility system to correct detected accessibility issues in the content.

Example 14 is the computer implemented method of any or all previous examples and further comprising:

surfacing a property setting user input mechanism, actuatable to set the value of the accessibility content property in a data store.

Example 15 is the computer implemented method of any or all previous examples wherein surfacing the property setting user input mechanism comprises:

surfacing the property setting user input mechanism for setting the value of the accessibility content property in a data store that is configured to be accessed by a plurality of different computing systems that generate content.

Example 16 is the computer implemented method of any or all previous examples wherein surfacing the property setting user input mechanism comprises:

surfacing the property setting user input mechanism for setting the value of the accessibility content property in an application-specific data store that is configured to be accessed by a single computing system that generates content.

Example 17 is the computer implemented method of any or all previous examples wherein surfacing the property setting user input mechanism comprises:

surfacing the property setting user input mechanism for setting the value of the accessibility content property in a personal contact list of the first user.

Example 18 is a computing system, comprising:

property setting logic configured to surface a property setting user input mechanism actuatable to set a value of an accessibility content property, corresponding to a user, in a data store, the value of the accessibility content property indicating whether the corresponding user is to receive content as accessibility content;

an accessibility content alert system that detects that a first user is to make content consumable by a second user;

data store interaction logic that accesses the accessibility content property corresponding to the second user;

tip generation logic that generates a tip user interface element for the first user indicating that the second user is to receive the content as accessibility content, based on the value of the accessibility content property corresponding to the second user; and link generation logic configured to generate a link user interface element actuatable by the first user to surface for the first user a user input mechanism that is actuatable to control an accessibility system to operate on the detected content.

Example 19 is the computing system of any or all previous examples wherein the accessibility content alert system comprises:

accessibility system control logic that, based on the value of the accessibility content property corresponding to the second user, generates control signals to control checking logic in an accessibility system to detect accessibility issues in the content and surface the detected accessibility issues for the first user.

Example 20 is the computing system of any or all previous examples wherein the accessibility content alert system comprises:

accessibility system control logic that, based on the value of the accessibility content property corresponding to the second user, generates control signals to control correction logic in an accessibility system to correct detected accessibility issues in the content.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
   at least one processor;
   memory storing instructions executable by the at least one processor, wherein the instructions, when executed, provide:
   an accessibility content alert system configured to:
   based on a detected input from a first user, identify content and a second user by whom the content is consumable;
   data store interaction logic configured to:
   access an accessibility content property that corresponds to the second user, the accessibility content property having a value indicating that the second user is to receive the content as accessibility content; and
   tip generation logic configured to:
   render, to the first user, a tip user interface element based on the value of the accessibility content property corresponding to the second user,
   the tip user interface element indicating that the second user is to receive the content as accessibility content;
   accessibility system control logic configured to:
   based on the value of the accessibility content property corresponding to the second user, control checking logic in an accessibility system to detect an accessibility issue, relative to the second user, in the content; and
   correction logic configured to correct the detected accessibility issue by transforming the content into accessibility content that is provided to the second user.

2. The computing system of claim 1, wherein the accessibility content alert system comprises:
   link generation logic configured to generate a link user interface element actuatable by the first user to surface for the first user a user input mechanism that is actuatable to control the accessibility system to operate on the detected content.

3. The computing system of claim 1, rein the accessibility content conforms to at least one of a rule, procedure, or guidelines directed to rendering the content accessible by the second user, and wherein the accessibility system control logic is configured to:
   render an indication of the detected accessibility issue to the first user.

4. The computing system of claim 1, wherein the accessibility system includes the correction logic, and the accessibility system control logic is configured to:
   based on the value of the accessibility content property corresponding to the second user, generate a control signal that controls the correction logic to correct a detected accessibility issue in the content.

5. The computing system of claim 1, wherein the computing system includes the accessibility system.

6. The computing system of claim 1, wherein the instructions provide:
   property setting logic configured to surface a property setting user input mechanism; and
   based on actuation of the property setting user input mechanism, set the value of the accessibility content property in a data store.

7. The computing system of claim 6, wherein the data store is accessible by a plurality of different computing systems that generate content.

8. The computing system of claim 6, wherein the data store comprises an application-specific data store that is configured to be accessed by a single computing system that generates content.

9. The computing system of claim 6, wherein the value of the accessibility content property is stored in a personal contact list of the first user.

10. A computer implemented method, comprising:
    based a detected input associated with a first user, identifying content and a second user by whom the content is consumable;

accessing an accessibility content property that corresponds to the second user, the accessibility content property having a value indicating that the second user is to receive the content as accessibility content;

based on the value of the accessibility content property indicating the second user is to receive the content as accessibility content, controlling checking logic in an accessibility system to detect an accessibility issue, relative to the second user, in the content; and rendering a tip user interface element, to the first user that indicates the second user is to receive the content as accessibility content, and identifies the detected accessibility issue; and correcting the detected accessibility issue by transforming the content into accessibility content that is provided to the second user.

11. The computer implemented method of claim 10, and further comprising:

generating; a link user interface element actuatable by the first user to surface, to the first user, a user input mechanism that is actuatable to control the accessibility system to operate on the detected content.

12. The computer implemented method of claim 10, and further comprising:

controlling, based on the value of the accessibility content property corresponding to the second user, correction logic in the accessibility system to correct the detected accessibility issue in the content.

13. The computer implemented method of claim 10, and further comprising:

surfacing a property setting user input mechanism; and based on actuation of the property setting user input mechanism, set the value of the accessibility content property in a data store.

14. The computer implemented method of claim 13, wherein data store is configured to be accessed by a plurality of different computing systems that generate content.

15. The computer implemented method of claim 13, wherein the data store comprises an application-specific data store that is configured to be accessed by a single computing system that generates content.

16. The computer implemented method of claim 13, wherein the value of the accessibility content property is stored in a personal contact list of the first user.

17. A computing system, comprising:

at least one processor;

memory storing instructions executable by the at least one processor, wherein the instructions, when executed, cause the computing system to:

surface a property setting riser input mechanism actuatable to set a value of an accessibility content property, corresponding to a user, in a data store, the value of the accessibility content property indicating whether the corresponding user is to receive content as accessibility content;

detect that a first user is to make content consumable by a second user;

based on the value of the accessibility content property corresponding to the second user, generate control signals to control correction logic in an accessibility system to correct detected accessibility issues in the content;

access the accessibility content property corresponding to the second user;

generate a tip user interface element for the first user indicating that the second user is to receive the content as accessibility content, based on the value of the accessibility content property corresponding to the second user; and generate a link user interface element actuatable by the first user to surface for the first user a user input mechanism that is actuatable to control an accessibility system to operate on the detected content.

18. The computing system of claim 17, wherein the instructions cause the computing system to:

based on the value of the accessibility content property corresponding to the second user, generate control signals to control checking logic in an accessibility system to detect accessibility issues in the content and surface the detected accessibility issues for the first user.

* * * * *